March 1, 1966  A. AINSWORTH  3,237,637

GAS PRESSURE CONTROLLED RELIEF DEVICES

Filed Sept. 7, 1962

3,237,637
GAS PRESSURE CONTROLLED RELIEF DEVICES
Alan Ainsworth, Thurso, Dounreay, Scotland, assignor to United Kingdom Atomic Energy Authority, London, England
Filed Sept. 7, 1962, Ser. No. 222,115
Claims priority, application Great Britain, Sept. 18, 1961, 33,418/61
7 Claims. (Cl. 137—251)

The present invention relates to gas pressure controlled relief devices and more particularly to a device of the kind employing a heavy liquid which has separate free surfaces exposed respectively to a reference pressure and the gas pressure under control so that normally a relief path for the latter pressure is blocked by the body of liquid, this path being unblocked by an increase of the pressure under control causing depression of the respective free surface. Devices of this kind are used on enclosures, such as glove boxes, for the containment of radioactive and toxic materials in atmospheres which, as a precaution against leakage out of the enclosure which, maintained at sub-atmospheric pressure, and in this field of application the device is commonly known as a "lute."

According to the present invention, a gas pressure controlled relief device comprises a first conduit adapted for communication with a reference pressure source, a second conduit adapted for communication with a gas pressure to be controlled, means for holding a body of liquid such that it forms separate free surfaces respectively in the two conduits and normally blocks intercommunication between the conduits, a liquid receptacle to which is discharged any liquid rising in the first conduit to a level above the normal level of the free surface therein, and means allowing gradual return into the liquid holding means of liquid received in the receptacle. The delay brought about by the gradual return is utilised in general terms to enhance the accuracy of control and to sustain a rapid rate of relief; more specifically it can serve to provide correction anticipating the pattern of pressure variation, and also it can take account of a need for the free surface to restore itself rather further than the point of reblocking the flow path in order to ensure a clean cut-off.

The arrangement controlling the return may comprise flow restricting means opposing the restoring displacement of the liquid. Furthermore, it may be arranged that the discharged liquid is detached from the main body followed by slow return of this detached portion. An embodiment of the invention employing the latter arrangement is illustrated isometrically by way of example in the accompanying drawings which in conjunction with the following description will afford a fuller understanding of the invention. In the drawings.

The illustrated embodiment is adapted to serve as a pressure relief device or lute for a glove box in which for example, an inert gas such as argon is to be maintained at a slightly sub-atmospheric pressure, for example—1 inch water gauge, against a somewhat lower pressure, for example—8 inches water gauge, pertaining in an extraction system.

Figure 1:
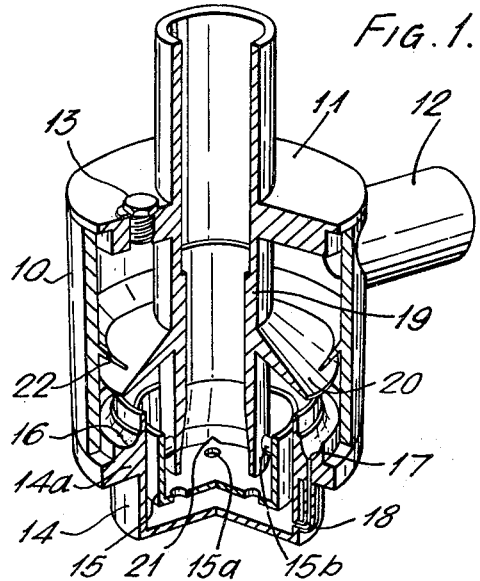
FIGURE 1 shows one form of relief device in accordance with the invention.

Referring to the embodiment in FIGURE 1, a cylindrical outer container 10 has a laterally opening pipe connection 12 for connecting to the extraction system and is joined sealingly, as by welding, to a top cover 11 having a filler plug 13; supported sealingly at its base, as by welding, is an assembly defining a cylindrical open-topped receptacle 14 within which is located in coaxial relationship a second open-topped receptacle 15 having a ring of holes 15a in its base. An annular flange part 14a of the outer receptacle 14 serves as a liquid collector and is channelled to form a gulley 16 with a fall towards a drain 17 which communicates through an external return pipe 18 with the bottom of the outer receptacle 14.

Penetrating the top cover 11, and formed integrally therewith, is a tube 19 for connecting externally to the glove box interior and terminating internally at an open end within the inner receptacle 15, this receptacle being supported by the tube 19 in coaxial relationship therewith by means of three equispaced spacer arms of which one, denoted 15b, appears in FIGURE 1, these arms being of elliptical section with the major axis vertical in order to reduce disturbance to the liquid flow pattern. A conical deflector plate 20 is formed integrally with and encircles the tube at a level above the receptacles. The tube is slightly divergent towards its open end by thinning of the wall and has at least one shallow notch 21 in its end edge, the shape of this notch reducing in width with increasing height; in FIGURE 1 the shape shown is an inverted V, and three such notches are provided in a symmetrical disposition. Notch dimensions which have proved successful in practical applications are a height of $3/32$ inch with a basal width of $3/4$ inch. The end edge is rounded or sharp-cornered to suit the surface tension of the liquid to be employed in the device.

Above the level of the conical deflector plate 20 is a lip 22 protruding inwardly and downwardly from the outer container 10.

Stainless steel is the preferred material for the construction of the device although alternatively certain synthetic resin materials would be suitable. A window may be included in the lower part of the outer container 10 to give a view of the liquid movements.

The device is charged through the filler plug with a heavy liquid such as mercury or an oil of high specific gravity, the quantity introduced being such that when the glove box pressure and the reference pressure provided by the extraction system take effect on the liquid at their respective correct values a free surface forms within the tube 19 at a normal level slightly above the notches 21. The determination of the appropriate quantity may be by simple calculation based on the difference between the levels, the volume of the receptacles 14 and 15, and the specific gravity of the liquid.

Slight variations of the glove box pressure are adjusted by venting to the extraction system at the inert gas supply valve means; the pressure relief device will only come into operation when the rate of pressure increase overwhelms the exhaust capacity of such valve means. If the increase tends to be small, the excess pressure will be dissipated by depression of the liquid free surface in the tube and bubbling through the liquid to the extraction system. The amount of the V notch uncovered by the liquid in the tube depends on the extent of free surface depression, and hence on the excess of pressure; consequently the flow area made available for relieving the pressure is dependent upon the excess. The angle of the V determines the rate of relief per unit of free surface depression until the end of the tube is reached.

A more sudden tendency for the glove box pressure to increase (as in the case of an onset of fire in the box contents when either the heat produced increases the pressure of the inert gas or additional gas is injected to discharge an extinguishant) causes the liquid in the inner receptacle 15 to be so violently disturbed that a portion is ejected upwards and deflected by the plate 20 so as to discharge into the gulley 16.

The gradual return of this detached portion of liquid through the drain 17 proceeds according to the degree of flow restriction in the return pipe 18, which may be adjustable as by means of a needle valve, and during this time the depleted main body of liquid remaining in the receptacle assembly offers less resistance to outflow from the tube 19; immediately following ejection, the liquid left in the inner receptacle is in practice so little as to be below the lower open end of the tube and rapid relief ensues. However, by virtue of the intercommunication between the receptacles 14 and 15 by means of the holes 15a, the level in the inner receptacle 15 is gradually restored, firstly by equalization with the level in the outer receptacle and secondly by the return of the detached liquid.

Figure 2:
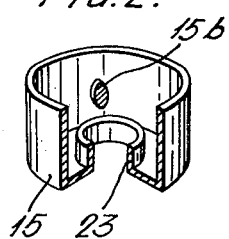
FIGURE 2 shows a modified form of one of the components in FIGURE 1.

In the modification of FIGURE 2, the intercommunication between the inner and outer receptacles is established by means of an upstanding tube 23 penetrating the base of the inner receptacle 15 centrally. This tube 23 is of such length that when in position in the device it terminates within the mouth of the tube 19 on a level with the apex of the V notches 21. Thus, with such a tube, the inner receptacle assumes an annular shape. The holes 15a are now omitted and therefore re-entry of the liquid into the inner receptacle following relief of a pressure surge is delayed until the glove box pressure has fallen to the resealing pressure. A uniform rapid rate of relief is therefore achieved and is terminated sharply with a clean cut-off.

I claim:

1. A gas pressure controlled relief valve device comprising a casing adapted for communication with a reference pressure source, a dip tube penetrating the casing and adapted externally of the casing for communication with a gas pressure to be controlled, an open-topped first liquid receptacle disposed within the casing such that an end of the dip tube extends into such receptacle, a liquid in the casing for effecting a liquid seal in the first receptacle, a liquid collector, means for effecting discharge to the collector of liquid rising in the first receptacle above a predetermined amount, a second receptacle in liquid transfer communication with the first receptacle, and means for effecting the gradual re-entry into the second receptacle of liquid received in the collector.

2. A gas pressure controlled relief valve device as set forth in claim 1, wherein the last-mentioned means is a pipe having a flow restricting characteristic.

3. A gas pressure controlled relief valve device as set forth in claim 1, wherein the second receptacle has direct liquid transfer communication with the first receptacle through a plurality of holes.

4. A gas pressure controlled relief valve device as set forth in claim 1, wherein the second receptacle has direct liquid transfer communication with the first receptacle through a tube which penetrates from the second receptacle through the first receptacle and terminates with an open end within the outline of but substantially at the same level as the open end of the dip tube.

5. A gas pressure controlled relief valve device comprising a casing adapted for communication with a reference pressure source, a dip tube penetrating the casing and adapted externally of the casing for communication with a gas pressure to be controlled, a first open-topped liquid receptacle disposed adjacent the bottom of the casing such that an end of the dip tube extends into such receptacle, a liquid in the casing for effecting a liquid seal in the first receptacle, a second open-topped receptacle surrounding the first receptacle and at least partially within the casing, a channelled flange extending around the open top of the second receptacle, a plate encircling the dip tube above the two receptacles to deflect liquid ejected from the first receptacle into the channel of the flange, means including a pipe having a flow restricting characteristic to effect the gradual re-entry into the second receptacle of liquid received in the channel, and means giving direct liquid transfer communication between the first and second receptacles.

6. A gas pressure controlled relief valve device as set forth in claim 5, wherein the end of the dip tube within the casing has at least one notch of a shape which reduces in width with increasing height.

7. A gas pressure controlled relief valve device comprising: a casing adapted for communication with a reference pressure source; a dip tube penetrating the casing and adapted externally of the casing for communication with a gas pressure to be controlled; a first liquid receptacle means disposed in said casing such that an end of said dip tube extends into said receptacle; a liquid in the casing for effecting a liquid seal in the first receptacle means, a relatively unrestricted passageway for effecting relatively rapid liquid overspill from said first receptacle in response to pressure surges in said controlled gas pressure; second liquid receptacle means surrounding said first liquid receptacle means and disposed at least partially within said casing for receiving liquid overspill from said first liquid receptacle means; and relatively restricted passage means for effecting relatively gradual re-entry into the first receptacle means of liquid received in the second receptacle means whereby to impose retardation on the rate at which a liquid free surface can be restored in the first receptacle to a level blocking the lower end of the dip tube.

References Cited by the Examiner
UNITED STATES PATENTS

| | | | |
|---|---|---|---|
| 971,099 | 9/1910 | Youngs | 137—254 |
| 1,724,279 | 8/1929 | Gruber | 137—251 |
| 1,858,202 | 5/1932 | Watkins | 137—254 |
| 2,966,166 | 12/1960 | Ohlen et al. | 137—312 X |

ISADOR WEIL, *Primary Examiner.*

W. F. O'DEA, *Examiner.*